(12) United States Patent
Yeoh et al.

(10) Patent No.: US 9,522,465 B2
(45) Date of Patent: Dec. 20, 2016

(54) MACHINE TOOL DEVICE

(75) Inventors: Sim Teik Yeoh, Gelugor Penang (MY); Rahman Khiri Abd, Kedah (MY); Chin Aun Ng, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 14/125,920

(22) PCT Filed: Apr. 26, 2012

(86) PCT No.: PCT/EP2012/057663
§ 371 (c)(1),
(2), (4) Date: Dec. 12, 2013

(87) PCT Pub. No.: WO2012/171702
PCT Pub. Date: Dec. 20, 2012

(65) Prior Publication Data
US 2014/0116742 A1 May 1, 2014

(30) Foreign Application Priority Data

Jun. 16, 2011 (DE) .......................... 10 2011 077 622

(51) Int. Cl.
*B25F 5/02* (2006.01)
*B23D 61/02* (2006.01)
(Continued)

(52) U.S. Cl.
CPC ................ *B25F 5/02* (2013.01); *B23D 49/11* (2013.01); *B23D 61/006* (2013.01);
(Continued)

(58) Field of Classification Search
CPC ..... B23D 49/11; B23D 61/006; B23D 61/026; B27F 3/00; B27F 5/02; H02K 5/08; H02K 7/145; H02K 11/28; H02K 11/33
(Continued)

(56) References Cited

U.S. PATENT DOCUMENTS 3,476,960 A * 11/1969 Rees ....................... H02K 7/145
174/138 D
3,703,646 A * 11/1972 Jacyno ................... H01H 9/063
200/1 V
(Continued)

FOREIGN PATENT DOCUMENTS

CN 101088714 A 12/2007
CN 201261184 Y 6/2009
(Continued)

OTHER PUBLICATIONS

International Search Report corresponding to PCT Application No. PCT/EP2012/057663, mailed Jul. 13, 2012 (German and English language document) (7 pages).

*Primary Examiner* — Scott A. Smith
(74) *Attorney, Agent, or Firm* — Maginot, Moore & Beck LLP

(57) ABSTRACT

A machine tool device, particularly a hand-held machine tool device, includes at least one screw that is configured to secure at least one metal component to at least one additional component in a form-fitting manner. The machine tool further includes an electrical insulating unit that is configured to prevent the conduction of current at least between the metal component and the screw.

12 Claims, 2 Drawing Sheets

(51) Int. Cl.
  *B23D 49/11* (2006.01)
  *B23D 61/00* (2006.01)
  *F16B 35/00* (2006.01)
  *F16B 5/02* (2006.01)

(52) U.S. Cl.
  CPC ............ B23D 61/026 (2013.01); F16B 35/00 (2013.01); F16B 5/02 (2013.01)

(58) Field of Classification Search
  USPC ...... 173/216, 217, 29, 131, 171; 310/47, 50, 310/52, 89; 279/106, 143
  See application file for complete search history.

(56) References Cited

U.S. PATENT DOCUMENTS

| | | | |
|---|---|---|---|
| 4,474,077 A | | 10/1984 | Debelius |
| 4,765,054 A | * | 8/1988 | Sauerwein ............ H02K 1/185 29/596 |
| 4,821,357 A | * | 4/1989 | Millette ................ A47L 13/08 15/93.1 |
| 5,006,740 A | * | 4/1991 | Palm .................... B23Q 11/005 310/43 |
| 5,027,684 A | * | 7/1991 | Neukam ............... B23D 61/026 83/481 |
| 6,671,969 B2 | * | 1/2004 | Phillips ................. B23D 49/11 30/377 |
| 6,865,813 B2 | * | 3/2005 | Pollak ................... B24B 23/04 30/166.3 |
| 6,898,854 B2 | * | 5/2005 | Zemlok ................. B27B 9/00 30/122 |
| 7,770,660 B2 | * | 8/2010 | Schroeder ............. B25F 5/02 173/1 |
| 2011/0266759 A1 | * | 11/2011 | Goldman .............. B24B 23/04 279/106 |
| 2011/0309589 A1 | * | 12/2011 | Maras .................... B25F 3/00 279/143 |

FOREIGN PATENT DOCUMENTS

| | | |
|---|---|---|
| CN | 101474787 A | 7/2009 |
| CN | 101522352 A | 9/2009 |
| DE | 33 20 429 A1 | 12/1984 |
| DE | 198 24 068 A1 | 12/1999 |
| DE | 10 2008 000 613 A1 | 9/2009 |
| DE | 10 2009 015 435 A1 | 9/2010 |
| EP | 2 062 700 A2 | 5/2009 |
| WO | 2009/112099 A1 | 9/2009 |

* cited by examiner

MACHINE TOOL DEVICE

This application is a 35 U.S.C. §371 National Stage Application of PCT/EP2012/057663, filed on Apr. 26, 2012, which claims the benefit of priority to Serial No. DE 10 2011 077 622.2, filed on Jun. 16, 2011 in Germany, the disclosures of which are incorporated herein by reference in their entirety.

BACKGROUND

There are already known hand-held power tools in which a metallic transmission housing is connected to a cover cap in a form-fitting manner by means of screws.

SUMMARY

The disclosure proceeds from a power-tool device having at least one screw, which is provided to fasten at least one metallic component and at least one further component to each other in a form-fitting manner.

Proposed is an electrical insulating unit, which is provided to prevent conduction of current, at least between the metallic component and the screw. An "electrical insulating unit" is to be understood to mean, in particular, a unit having an electrical conductivity of less than $10^{-10}$ S/cm. This makes it possible, in particular, to prevent electrical current from being conducted from the tool, via the metallic component and the screw, to a user in the case of a flow of current through a tool to which the power-tool device is assigned, for example as a result of damage to a current-carrying conductor by the tool, thereby making it possible to prevent a risk of electric shock to the user.

It is additionally proposed that the metallic component be constituted by an internal metallic housing. An "internal metallic housing" is to be understood to mean, in particular, a component of the power-tool device, realized as a housing, that is made of a metal and that, when the power-tool device is in a mounted state, is at least mostly, and preferably completely, encompassed by surrounding components, in particular by surrounding housing parts, and that is therefore located outside of a possible region of contact by a user. It is advantageously possible to prevent the occurrence of a flow of electrical current, from inside the power-tool device to an outer region of the power tool that can be contacted by the user, that can endanger the user.

It is additionally proposed that the electrical insulating unit comprise at least one electrically insulating surface coating. A "surface coating" is to be understood to mean, in particular, a material layer, which forms a surface of an element that is different from a main body of the element, and whose material thickness is small in comparison with a material thickness of the whole element. That "the material thickness of the material layer is small in comparison with a material thickness of the element" is to be understood to mean, in particular, that the material thickness of the material layer has a value that is maximally 5 percent, advantageously maximally 1 percent, and preferably maximally 0.1 percent of a value of the material thickness of the element. An "electrically insulating" surface coating is to be understood to mean, in particular, a surface coating that has an electrical conductivity of less than $10^{-10}$ S/cm. Advantageously, an inexpensive electrical insulating unit of simple design can be obtained. Preferably, the at least one screw has the electrically insulating surface coating. Advantageously, therefore, in particular, a coating can be applied to ordinary, commercially available screws, thereby enabling costs to be saved. Moreover, advantageously, in particular in the case of damage to the electrically insulating surface coating, the screw can be easily exchanged, thereby advantageously enabling savings to be made in costs, time and work. In principle, however, it is also possible for the metallic component and/or the further component to have the electrically insulating surface coating. Moreover, the realization as a surface coating makes it possible to achieve an insulating unit for a power-tool device in which it is possible to dispense with a structural redesign of the power-tool device. In principle, it is also possible, as an alternative to an electrically insulating surface coating of the screws, to use screws composed entirely of insulating material.

It is additionally proposed that the surface coating be composed of a non-conducting material applied electrolytically. A "non-conducting material applied electrolytically" is to be understood to mean, in particular, a material that constitutes an electrical non-conductor, and that is applied to a substrate, for example a screw, by means of electrolysis. A "non-conducting material" is to be understood to mean, in particular, a material having an electrical conductivity of less than $10^{-10}$ S/cm. It is possible to obtain a resistant layer that, in particular, has a high scratch resistance. Advantageously, it is thereby possible, in particular, to prevent the occurrence of a conductive connection via the screw as a result of damage to the surface coating, which constitutes an electric shock hazard.

It is additionally proposed that the at least one screw comprise a smooth partial region. A "smooth partial region" is to be understood to mean, in particular, a region of the screw that does not have a screw thread, and that extends at least over 10 percent, advantageously at least over 20 percent, and preferably at least over 30 percent of a longitudinal extent of the screw, and extends maximally over 90 percent, advantageously maximally over 80 percent, and preferably over maximally 60 percent of the longitudinal extent of the screw. Advantageously, it is possible to increase a distance between an end of the screw, that can be contacted by the user, and a component. Furthermore, advantageously, it is possible to prevent damage to the coating in a region of the screw that can be contacted by the user when the screw is in a screwed-in state, during a process of screwing-in the screw.

It is additionally proposed that the smooth partial region adjoin a screw head. In a screwed connection, the screw head is normally fitted on a region that can be contacted by the user. Advantageously, the region that can be contacted by the user can be protected against damage to the coating, and a risk of electric shock to the user can be prevented.

It is additionally proposed that the electrical insulating unit comprise at least one additional insulating element, which is provided to be disposed between the screw and the metallic component. An "additional insulating element" is to be understood to mean, in particular, an insulating element constituting an element that is different from the screw and the metallic component. Preferably, the additional insulating element is provided to be disposed between the smooth partial region and the metallic component. This can be effected, for example, by covering the smooth region with a shrink-down tube or with a sleeve of non-conducting material. In principle, however, alternative designs of the additional insulating element are also conceivable, for example a lining of a screw hole in the metallic component, the lining being made of a non-conductor, for example a plastic material. The additional insulating layer advantageously further increases safety for the user and prevents the risk of electric shock to the user.

There is additionally proposed at least one insulating rib, which is disposed in a screw hole in the metallic component that is provided to receive the screw. An "insulating rib" is to be understood to mean, in particular, a body made of a non-conducting material that is provided to serve as a spacer between the screw and the metallic component. Preferably, the insulating rib is made of a non-conducting plastic. Preferably, the insulating rib is realized as a cylindrical body having a hole, through which the screw can pass. In a preferred design, the insulating rib is integral with the further component, and realized as a projecting region of the further component. An additional insulating layer can be achieved between the screw and the component, thereby advantageously enabling the safety of the user to be further increased.

It is additionally proposed that the metallic component be constituted by a transmission housing, and the further component be constituted by a cover cap. Advantageously, therefore, it is possible to reliably prevent, in particular, a flow of current via a metallic transmission housing, that is in conductive contact with the tool, to a screw that is disposed on the outside of a cover cap and that can be contacted by the user. The risk of electric shock to the user can thus be kept to a low level.

There is furthermore proposed a portable power tool, in particular a hand-held power tool, having a power-tool device according to the disclosure.

It is additionally proposed that the portable power tool comprise a bevel gear transmission. The portable power tool is realized, for example, as an angle grinder, as a jigsaw and/or, particularly advantageously, as an oscillating hand-held power tool, in which a rotary motion is also converted, via the bevel gear transmission, into an oscillating back-and-forth motion. In the manipulation of such a portable power tools, it is frequently necessary to contact the portable power tool on outer regions that are outside of guide regions specially provided for this purpose, with the result that there is a high probability of contact with screws, in particular screws that connect an internal metallic component to an external housing component.

BRIEF DESCRIPTION OF THE DRAWINGS

In the figures.

DETAILED DESCRIPTION

Figure 1:
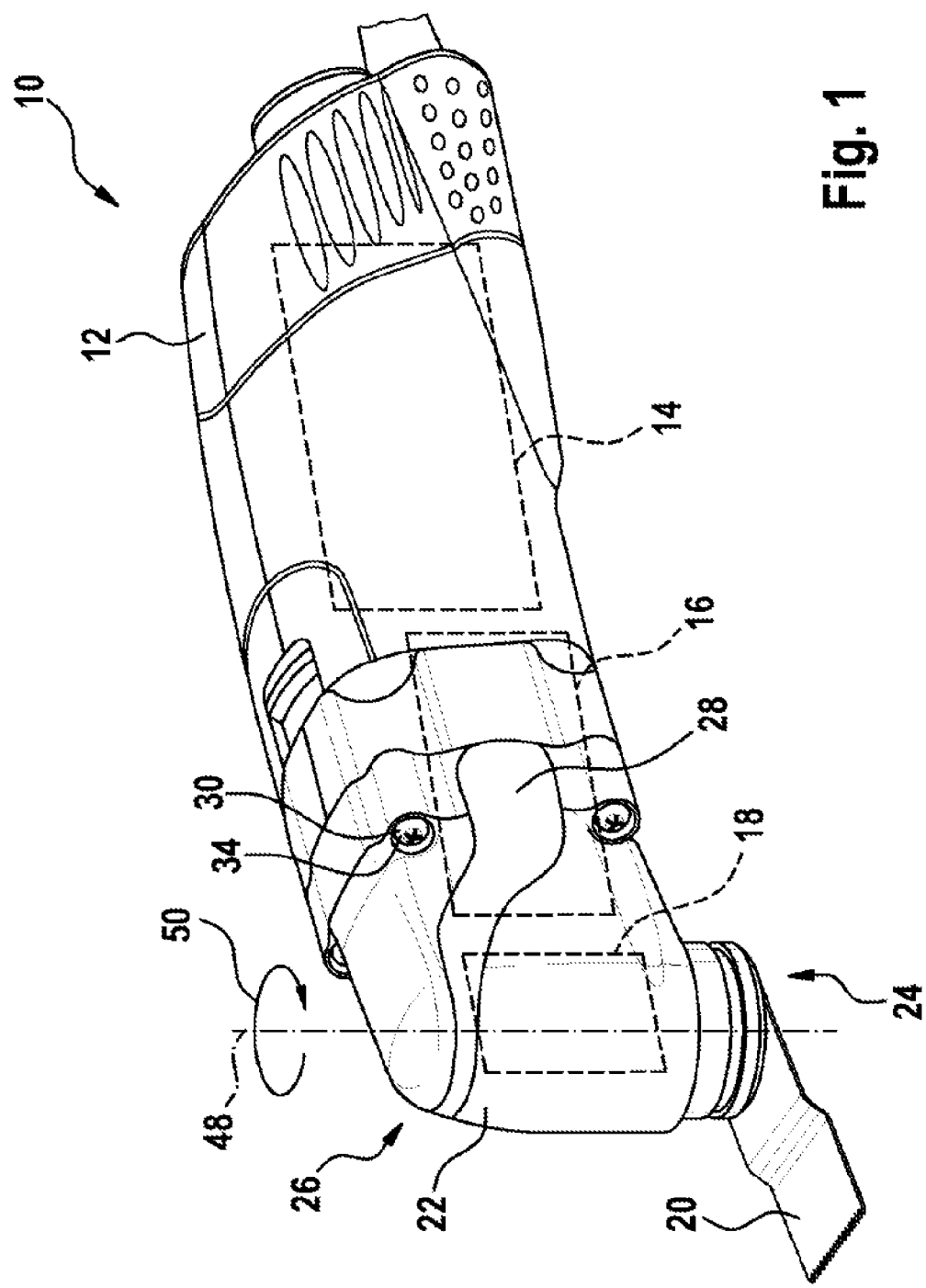
FIG. 1 shows a hand-held power tool having an oscillating tool.

FIG. 1 shows a hand-held power tool 10 having an oscillating tool 20 that is disposed in a tool receiver 24. A housing 12 of the hand-held power tool 10 encloses an electric motor unit 14 and a transmission unit 16 that comprises a bevel gear transmission. Via the transmission unit 16 and an output unit 18, a rotary motion of the electric motor unit 14 is transmitted to the tool 20. In particular, the rotary motion is reversed, and the tool 20 is made to execute an oscillating working motion in a circumferential direction 50 about a rotation axis 48.

A cover cap 22 is fastened to the housing 12 in a form-fitting manner by means of four screws 30, of the same type, which are disposed in screw holes 52 that are uniformly distributed around the hand-held power tool 10 in the circumferential direction. The cover cap 22 constitutes an operating unit 26, which is provided to be gripped by a user for the purpose of guiding the hand-held power tool 10. In particular, an operating lever 28, disposed on the operating unit 26, is provided for this purpose. In cases in which the hand-held power tool 10 is used in a confined space, in particular, the user, in order to guide the hand-held power tool 10 in a precise manner, may grip and guide the operating unit 26 at a region other than the operating lever 28 by the user.

Figure 2:
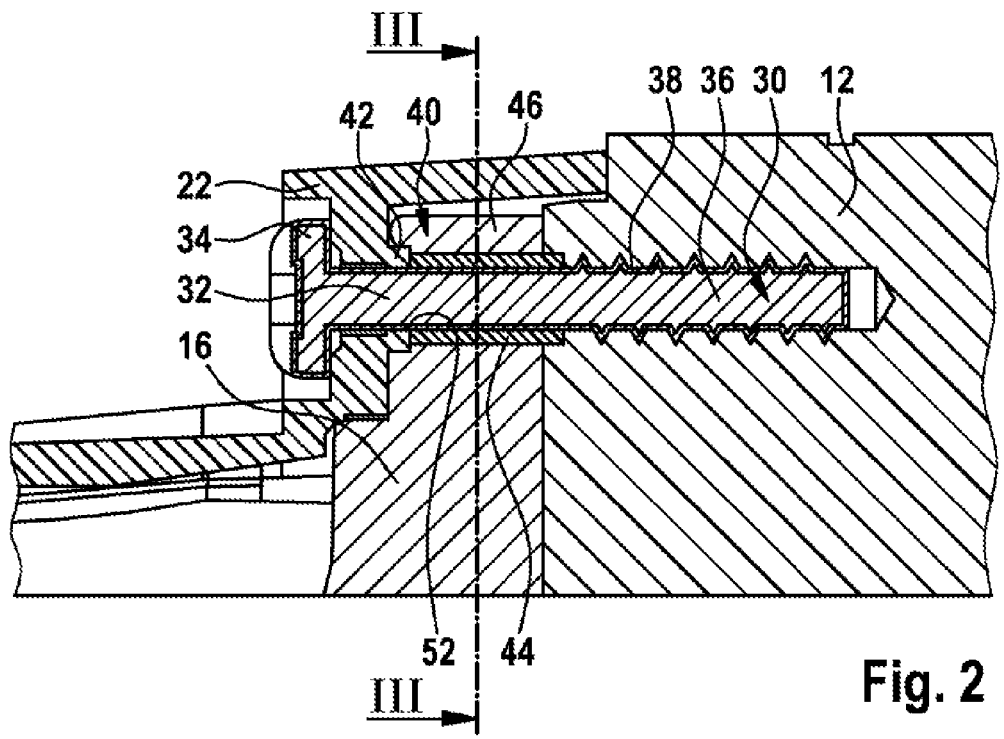
FIG. 2 shows a schematic detail view of an insulating unit according to the disclosure, in a sectional representation.

The transmission unit 16 has an interior metallic housing in the form of a transmission housing 46, which is enclosed by the cover cap 22 and the housing 12, and which constitutes an internal component of the hand-held power tool 10. The transmission housing 46 is connected to the cover cap 22 and the housing 12 in a form-fitting manner. For this purpose, a respective screw 30 is inserted in one of the four screw holes 52, which extend from the cover cap 22, through the transmission housing 46, and into the housing 12 (cf. FIG. 2). A diameter of the screw hole 52 is dimensioned such that the screw 30, together with additional elements of an electrical insulating unit 40, can be inserted without play into the screw hole 52. In the region of the screw hole 52, the housing 12 has a thread, which is provided to act in combination with an external thread of the screw 30, in order to achieve a form-fitting connection between the cover cap 22, the transmission housing 46 and the housing 12. The screw 30 comprises a screw head 34, which is adjoined by a cylindrical screw body. The screw body comprises a smooth partial region 32, and a region that has an external thread. The smooth partial region 32 extends over 45 percent of a total length of the screw body. When the screw 30 is in a screwed-in state, the screw head 34 bears against the outside of the hand-held power tool 10, in a recess of the cover cap 22, where it is partially protected against contact by the user.

The electrical insulating unit 40 is provided to prevent a flow of current between the internal metallic transmission housing 46, via the screw 30. The electrical insulating unit 40 comprises an electrically insulating surface coating 38 of the screw 30, which is composed of an electrolytically applied coating of a non-conducting material. The smooth partial region 32 is surrounded by an additional insulating element 44, in the form of a shrink-down tube, which is disposed between the screw 30 and the transmission housing 46. The shrink-down tube has been brought, by means of heat treatment, into a state in which it covers the smooth partial region 32 without play, and has a layer thickness of 0.5 mm. The additional insulating element 44 constitutes an additional insulating layer between the screw 30 and the transmission housing 46, and further prevents damage to the electrically insulating surface coating 38 in the smooth partial region 32 during an operating of screwing-in the screw 30. An insulating rib 42 is disposed, in the region of the screw hole 52, in the metallic transmission housing 46, and constitutes an insulating layer, between the transmission housing 46 and the screw 30, that is additional to the electrically insulating surface coating 38. The insulating rib 42 is realized as a projecting region of the cover cap 22, and constitutes a cylindrical region having a hole, through which the screw 30 is passed.

Figure 3:
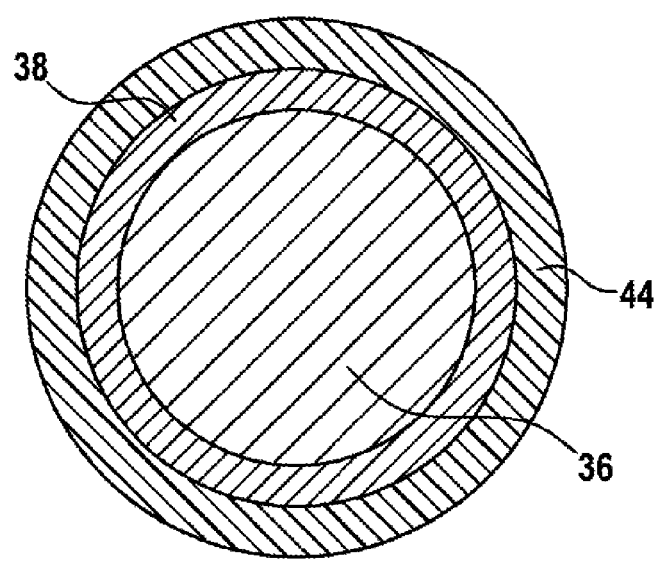
FIG. 3 shows a schematic sectional representation through a screw according to the disclosure.

FIG. 3 shows a schematic sectional representation, through a screw 30 according to the disclosure, in a plan view from a direction facing away from the screw head 34. The screw 30 has a screw core 36, which is surrounded by the electrically insulating surface coating 38. A material thickness of the electrically insulating surface coating 38 is 50 μm, and is therefore significantly less than a material thickness of the screw core 36. In the smooth partial region 32 of the screw 30 that does not have a screw thread, the screw 30 is surrounded by the insulating element 44 that is additional to the electrically insulating surface coating 38.

The invention claimed is:

1. A power-tool device, comprising:
    an external housing;
    an internal metallic housing;
    a cover cap on the external housing that covers the internal metallic housing and is configured to be gripped by a user;
    at least one screw that extends through the cover cap and the internal metallic housing and secures the cover cap and the internal metallic housing to the external housing; and
    an electrical insulating unit configured to prevent conduction of current at least between the internal metallic housing and the screw.

2. The power-tool device at least as claimed in claim 1, wherein the electrical insulating unit comprises at least one electrically insulating surface coating.

3. The power-tool device as claimed in claim 2, wherein the surface coating includes a non-conducting material applied electrolytically.

4. The power-tool device as claimed in claim 1, wherein the at least one screw comprises a smooth partial region.

5. The power-tool device as claimed in claim 4, wherein the smooth partial region adjoins a screw head.

6. The power-tool device as claimed in claim 1, wherein the electrical insulating unit comprises at least one additional insulating element configured to be disposed between the screw and the internal metallic housing.

7. The power-tool device as claimed in claim 1, further comprising at least one insulating rib disposed in a screw hole in the internal metallic housing that is provided to receive the screw.

8. The power-tool device as claimed in claim 1, wherein the internal metallic housing comprises a transmission housing.

9. The power-tool device as claimed in claim 1, wherein the power-tool device is configured as a hand-held power-tool device.

10. A portable power tool, comprising:
    a power-tool device including:
    an external housing;
    an internal metallic housing;
    a cover cap on the external housing that covers the internal metallic housing and is configured to be gripped by a user;
    at least one screw that extends through the cover cap and the internal metallic housing and secures the cover cap and the internal metallic housing to the external housing; and
    an electrical insulating unit configured to prevent conduction of current at least between the internal metallic housing and the screw.

11. The portable power tool as claimed in claim 10, further comprising a bevel gear transmission.

12. The portable power tool as claimed in claim 10, wherein the portable power tool is configured as a hand-held power tool, and wherein the power-tool device is configured as a hand-held power tool device.

* * * * *